United States Patent
Sasaki et al.

(10) Patent No.: US 10,553,899 B2
(45) Date of Patent: Feb. 4, 2020

(54) BATTERY INCLUDING A POLYETHER-BASED ORGANIC SOLID ELECTROLYTE

(71) Applicant: Panasonic Intellectual Property Management Co., Ltd., Osaka (JP)

(72) Inventors: Izuru Sasaki, Kyoto (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 78 days.

(21) Appl. No.: 15/063,458

(22) Filed: Mar. 7, 2016

(65) Prior Publication Data

US 2016/0294004 A1 Oct. 6, 2016

(30) Foreign Application Priority Data

Apr. 2, 2015 (JP) .................................. 2015-076043

(51) Int. Cl.
*H01M 4/62* (2006.01)
*H01M 10/0565* (2010.01)
(Continued)

(52) U.S. Cl.
CPC ....... *H01M 10/0565* (2013.01); *H01M 4/131* (2013.01); *H01M 4/133* (2013.01);
(Continued)

(58) Field of Classification Search
None
See application file for complete search history.

(56) References Cited

U.S. PATENT DOCUMENTS

| 6,451,487 B1 | 9/2002 | Besner et al. |
| 2008/0124630 A1* | 5/2008 | Kim ...................... H01M 4/362 |
| | | 429/213 |

(Continued)

FOREIGN PATENT DOCUMENTS

| EP | 2693555 A1 | 2/2014 |
| JP | 9-330717 | 12/1997 |

(Continued)

OTHER PUBLICATIONS

The Extended European Search Report issued with respect to Application No. 16158179.8, dated Aug. 2, 2016.

(Continued)

*Primary Examiner* — Lucas J. O'Donnell
(74) *Attorney, Agent, or Firm* — Greenblum & Bernstein, P.L.C.

(57) ABSTRACT

A battery has a cathode, an anode, and a first solid electrolyte. The cathode contains a particle of a cathode active material, and the anode contains a particle of an anode active material. The first solid electrolyte is disposed between the cathode and the anode. At least one of the surface of the particle of the cathode active material and the surface of the particle of the anode active material is coated with a polyether-based organic solid electrolyte. The polyether-based organic solid electrolyte is in contact with the first solid electrolyte. The polyether-based organic solid electrolyte is a compound of a polymer having an ether bond and an electrolytic salt.

10 Claims, 7 Drawing Sheets

(51) Int. Cl.
  *H01M 4/525* (2010.01)
  *H01M 10/0525* (2010.01)
  *H01M 10/056* (2010.01)
  *H01M 4/131* (2010.01)
  *H01M 10/0562* (2010.01)
  *H01M 4/133* (2010.01)
  *H01M 4/36* (2006.01)
  *H01M 4/583* (2010.01)
  *H01M 4/587* (2010.01)

(52) U.S. Cl.
  CPC ............ *H01M 4/366* (2013.01); *H01M 4/525* (2013.01); *H01M 4/583* (2013.01); *H01M 4/62* (2013.01); *H01M 10/056* (2013.01); *H01M 10/0525* (2013.01); *H01M 10/0562* (2013.01); *H01M 4/587* (2013.01); *H01M 2300/0082* (2013.01)

(56) References Cited

U.S. PATENT DOCUMENTS

| | | | |
|---|---|---|---|
| 2011/0281173 A1* | 11/2011 | Singh | H01M 2/16 429/306 |
| 2013/0059202 A1 | 3/2013 | Nishimura et al. | |
| 2015/0372344 A1 | 12/2015 | Iwasaki et al. | |

FOREIGN PATENT DOCUMENTS

| | | |
|---|---|---|
| JP | 11-007942 A | 1/1999 |
| JP | 2001-176498 | 6/2001 |
| JP | 2014-154407 | 8/2014 |

OTHER PUBLICATIONS

Communication pursuant to Article 94(3) EPC dated Aug. 29, 2017 for European Patent Application No. 16158179.8.

* cited by examiner

BATTERY INCLUDING A POLYETHER-BASED ORGANIC SOLID ELECTROLYTE

BACKGROUND

1. Technical Field

The present disclosure relates to a battery and an electrode material for a battery.

2. Description of the Related Art

Japanese Unexamined Patent Application Publication No. 2014-154407 discloses an all-solid-state lithium secondary battery in which particles of a cathode active material have a layer of sulfide solid electrolyte on their surface.

SUMMARY

The battery according to the related art should be further improved in terms of charge-discharge characteristics.

In one general aspect, the techniques disclosed here feature a battery. The battery has a cathode, an anode, and a first solid electrolyte. The cathode contains a particle of a cathode active material, and the anode contains a particle of an anode active material. The first solid electrolyte is disposed between the cathode and the anode. At least one of the surface of the particle of the cathode active material and the surface of the particle of the anode active material is coated with a polyether-based organic solid electrolyte. The polyether-based organic solid electrolyte is in contact with the first solid electrolyte. The polyether-based organic solid electrolyte is a compound of a polymer having an ether bond and an electrolytic salt. In one general aspect, the techniques disclosed here feature an electrode material. The electrode material includes a particle of an electrode active material and a polyether-based organic solid electrolyte. A surface of the particle of the electrode active material is coated with the polyether-based organic solid electrolyte. The polyether-based organic solid electrolyte is a compound of a polymer having an ether bond and an electrolytic salt. The coating of the polyether-based organic solid electrolyte has an average thickness of 20 nm or less.

The present disclosure can improve the charge-discharge characteristics of a battery.

It should be noted that general or specific embodiments may be implemented as a system, a method, an integrated circuit, a computer program, a storage medium, or any selective combination thereof.

Additional benefits and advantages of the disclosed embodiments will be apparent from the specification and drawings. The benefits and/or advantages may be individually provided by the various embodiments and features of the specification and drawings, and need not all be provided in order to obtain one or more of the same.

DETAILED DESCRIPTION

The following describes some embodiments of the present disclosure with reference to drawings.

Embodiment 1

Figure 1:
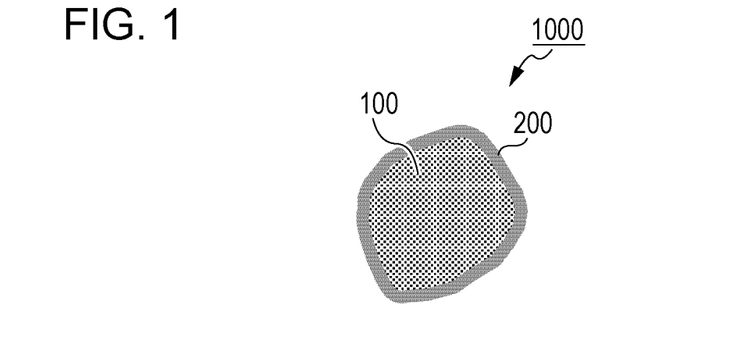
FIG. 1 schematically illustrates the structure of a battery electrode material (an electrode material for a battery) according to Embodiment 1.

FIG. 1 schematically illustrates the structure of a battery electrode material (an electrode material for a battery) 1000 according to Embodiment 1.

The battery electrode material 1000 according to Embodiment 1 includes an electrode active material particle 100 and a polyether-based organic solid electrolyte 200.

The surface of the electrode active material particle 100 is coated with the polyether-based organic solid electrolyte 200.

The polyether-based organic solid electrolyte 200 is a compound of a polymer having an ether bond and an electrolytic salt.

The advantages this structure provides are described in detail below.

Figure 2:
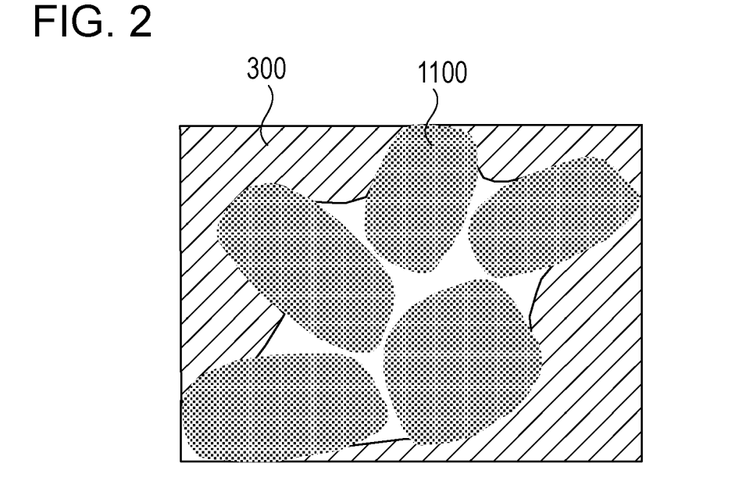
FIG. 2 schematically illustrates the structure of an aggregate of a battery electrode material according to a comparative example.

FIG. 2 schematically illustrates the structure of an aggregate of electrode active material particles 1100 according to a comparative example.

In FIG. 2, the aggregate is surrounded by a solid electrolyte 300.

The electrode active material particles 1100 according to a comparative example, illustrated in FIG. 2, are not coated with a polyether-based organic solid electrolyte 200.

The following description takes an all-solid-state sulfide-electrolyte lithium secondary battery (an all-solid-state lithium secondary battery in which a sulfide solid electrolyte is used) as an example. In general, an electrode (the cathode or anode) of an all-solid-state sulfide-electrolyte lithium secondary battery is produced by mixing an electrode active material (a cathode active material or an anode active material) and a sulfide solid electrolyte and pressing the mixed powder. During pressing, the sulfide solid electrolyte is deformed to the shape of the particles of the electrode active material. As a result, an interface is formed at which the electrode active material and the sulfide solid electrolyte are in close contact with each other.

In an all-solid-state sulfide-electrolyte lithium secondary battery structured as in FIG. 2, however, small gaps are formed by particles of an active material. Because of these gaps, the sulfide solid electrolyte deformed during pressing is not sufficiently spread to, for example, the inside of the aggregate of the particles of the electrode active material. As a result, there are many regions where the electrode active material and the sulfide solid electrolyte are out of contact with each other.

Charge-discharge reactions proceed at points of contact between an active material and a solid electrolyte as a pathway for lithium ions to pass through. This means that if there is any region where the active material and the solid electrolyte are out of contact with each other as in the comparative example illustrated in FIG. 2, the charge-discharge reactions do not proceed satisfactorily. As a result, the comparative example illustrated in FIG. 2 has the disadvantage of loss of charge-discharge characteristics.

Furthermore, the use of an active material having a layer of sulfide solid electrolyte on its surface, such as the one disclosed in Japanese Unexamined Patent Application Publication No. 2014-154407, leads to the active material expanding and shrinking to an extent roughly corresponding to several hundredths of its volume during charging and discharging. These changes in volume place strains on, and eventually break, the layer of sulfide solid electrolyte on the surface of the active material. The break may cause the sulfide solid electrolyte to detach from the active material. In such regions of detachment, the active material and the solid electrolyte are out of contact with each other. As a result, the charge-discharge characteristics are deteriorated.

The battery electrode material 1000 according to Embodiment 1, however, makes possible a battery with the advantages described below.

Figure 3:
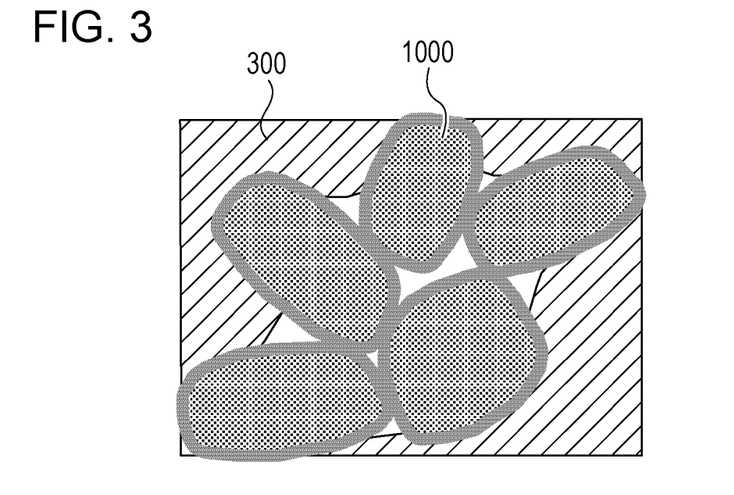
FIG. 3 schematically illustrates the structure of an aggregate of the battery electrode material according to Embodiment 1.

FIG. 3 schematically illustrates the structure of an aggregate of the battery electrode material 1000 according to Embodiment 1.

In FIG. 3, the aggregate is surrounded by a solid electrolyte 300.

The solid electrolyte 300 is, for example, a sulfide solid electrolyte or an oxide solid electrolyte. The solid electrolyte 300 is, for example, an inorganic solid electrolyte.

As illustrated in FIG. 3, when the battery electrode material 1000 according to Embodiment 1 is used, the polyether-based organic solid electrolyte is positioned in gaps such as those that can be formed between the electrode active material and the solid electrolyte 300 or between particles of the electrode active material. The formation of such gaps is reduced, and the area of electrical contact between the electrode active material and the solid electrolyte 300 is increased. As a result, the charge-discharge characteristics of the battery are improved.

Furthermore, the polyether-based organic solid electrolyte is more flexible and deformable than the solid electrolyte 300. To be more specific, sulfide solid electrolytes have Young's moduli of approximately 18 to 25 GPa, whereas the polyether-based organic solid electrolyte can be designed to have approximately 1 to 3 GPa. This ensures that those strains that occur when the electrode active material expands and shrinks during charging and discharging are relaxed, and the break in the solid electrolyte 300 that would be caused by such strains is prevented. The detachment of the solid electrolyte 300 from the electrode active material due to such strains is also prevented. The electrode active material and the layer of polyether-based organic solid electrolyte therefore remain in contact with each other even after repeated charge and discharge cycles. As a result, the battery can be repeatedly charged and discharged with limited loss of its charge and discharge capacities.

The following describes a preferred average thickness of the coating of the polyether-based organic solid electrolyte.

Charging and discharging reactions at an active material require a supply of electrons in addition to metallic ions (e.g., lithium ions). For example, in a known all-solid-state sulfide-electrolyte lithium secondary battery, electrons supplied from a collector propagate throughout a mixture layer via points of connection between portions of the active material or between the active material and a conductive agent.

The polyether-based organic solid electrolyte according to this embodiment of the disclosure is an insulator for electrons. This means that if the coating of the polyether-based organic solid electrolyte, surrounding the active material, has too large an average thickness, supplies of electrons to the active material may be blocked, slowing down the charging and discharging reactions.

If the average thickness of the coating of the polyether-based organic solid electrolyte is sufficiently small, however, the charging and discharging reactions are allowed to proceed. This appears to be because of what is called tunneling, i.e., penetration of electrical current through a potential barrier.

Thus, in the battery electrode material 1000 according to Embodiment 1, the average thickness of the coating of the polyether-based organic solid electrolyte 200 can be 20 nm or less.

This prevents the inhibition of charge and discharge reactions by the polyether-based organic solid electrolyte.

In the battery electrode material 1000 according to Embodiment 1, the average thickness of the coating of the polyether-based organic solid electrolyte 200 can be 10 nm or less.

This enhances the discharge capacity of the battery.

In the battery electrode material 1000 according to Embodiment 1, the average thickness of the coating of the polyether-based organic solid electrolyte 200 can be 1 nm or more. If the average thickness of the coating is less than 1 nm, the polyether-based organic solid electrolyte cannot occupy sufficiently large spaces in gaps such as those that can be formed between the electrode active material and the solid electrolyte 300 or formed between particles of the electrode active material. The effects of the coating will be insignificant if the average thickness of the coating is less than 1 nm.

The "average thickness" of the coating of the polyether-based organic solid electrolyte is calculated from the quantity of the coating polyether-based organic solid electrolyte.

To be more specific, the average thickness (m) is calculated according to the following formula:

$$\text{Average thickness} = W/\rho/S,$$

where $W$ (g) is the quantity of the coating polyether-based organic solid electrolyte, $\rho$ (g/m$^3$) is the density of the polyether-based organic solid electrolyte, and $S$ (m$^2$) is the surface area of the coated particles of the active material.

For example, if the polyether-based organic solid electrolyte has a density of 1.45 (g/cm$^3$), the average thickness (m) is calculated according to the following formula:

$$\text{Average thickness} = W/1.45/S \times 1000.$$

The quantity $W$ (g) of the coating polyether-based organic solid electrolyte can be determined by, for example, the following method. First, the coated particles of the active material are immersed in a solvent such as acetonitrile to make the polyether-based organic solid electrolyte completely dissolved. The resulting solution is filtered, and the filtrate is analyzed using ICP or any other chemical assay. This yields the quantity W (g) of the coating polyether-based organic solid electrolyte.

The surface area S (m$^2$) of the coated particles of the active material can be determined by, for example, the following method. First, the coated particles of the active material are immersed in a solvent such as acetonitrile to make the polyether-based organic solid electrolyte completely dissolved. The resulting solution is filtered, and the residue is analyzed using physical gas adsorption or similar. This yields the surface area S (m$^2$) of the coated particles of the active material.

The thickness of the polyether-based organic solid electrolyte on the surface of one electrode active material particle 100 can be determined by, for example, exposing a cross-section of the coated particle of the active material using cryo-FIB or similar and then observing it under a transmission electron microscope (TEM) or similar.

Furthermore, all-solid-state sulfide-electrolyte lithium secondary batteries, for example, vary in the size of the area where an active material and the sulfide solid electrolyte are out of contact with each other according to factors such as the hardness, diameter, shape, and specific surface area of the particles of the active material. The optimum average thickness of the coating polyether-based organic solid electrolyte therefore varies within the aforementioned range of preferred average thicknesses according to the active material used.

In the battery electrode material 1000 according to Embodiment 1, the polymer as a component of the polyether-based organic solid electrolyte 200 may have an ethylene oxide structure.

This leads to increased ionic conductivity. The increased ionic conductivity allows faster transport of ions to the electrode active material through the coating polyether-based organic solid electrolyte. As a result, the charge and discharge capacities of the battery are enhanced.

In the battery electrode material 1000 according to Embodiment 1, the polymer as a component of the polyether-based organic solid electrolyte 200 can be polyethylene oxide.

This leads to a further increase in ionic conductivity.

In the following, the details of the polyether-based organic solid electrolyte are described.

The polyether-based organic solid electrolyte as mentioned herein refers to a compound formed by a polymer that structurally contains an ether bond, —R$^1$—O—R$^2$—, and by an electrolytic salt (e.g., a lithium-containing supporting electrolytic salt).

For fast transport of ions to the coated active material, it is preferred that the polyether-based organic solid electrolyte have high ionic conductivity.

For close contact with the active material to be maintained even after repeated charge and discharge cycles, it is preferred that the polyether-based organic solid electrolyte have high flexibility and deformability.

The following describes the polymer that structurally contains an ether bond, a component of the polyether-based organic solid electrolyte.

The R$^1$ and R$^2$ in the ether bond —R$^1$—O—R$^2$— are hydrocarbon groups. To be more specific, each of the R$^1$ and R$^2$ is a methylene group, an ethylene group, a propylene group, or similar. The R$^1$ and R$^2$ may be hydrocarbon groups of the same kind. Alternatively, the R$^1$ and R$^2$ may be different hydrocarbon groups.

The polymer can also be one in which ether bonds are connected in a linear chain. To be more specific, the polymer can be a linear polymer crosslinked via groups such as hydroxy, carboxy, or amino groups.

The polymer can also be one having an ethylene oxide structure, i.e., a linear polymer in which the R$^1$ and R$^2$ are ethylene groups. Such kinds of polymers have high ionic conductivity and are suitable for use as the aforementioned polymer. For example, the polymer can be polyethylene oxide.

In the battery electrode material 1000 according to Embodiment 1, the electrolytic salt as a component of the polyether-based organic solid electrolyte 200 can be lithium bis(trifluoromethanesulfonyl)imide.

This leads to a further increase in ionic conductivity and makes the polyether-based organic solid electrolyte even more flexible.

The electrolytic salt as a component of the polyether-based organic solid electrolyte 200 can be, for example, a lithium-containing supporting electrolytic salt.

Examples of lithium-containing supporting electrolytic salts include LiN(SO$_2$CF$_3$)$_2$, LiN(SO$_2$F)$_2$, LiClO$_4$, LiBF$_4$, LiPF$_6$, LiAlCl$_4$, LiSbF$_6$, LiSCl, LiCF$_3$SO$_3$, LiCF$_3$CO$_2$, LiAsF$_6$, LiB$_{10}$Cl$_{10}$, LiCl, LiBr, and LiI. Any one of these lithium-containing supporting electrolytic salts can be used alone. Alternatively, it is possible to use two or more of these lithium-containing supporting electrolytic salts.

The ionic conductivity and flexibility of the polyether-based organic solid electrolyte vary with the kind of the electrolytic salt the solid electrolyte contains.

Of the lithium-containing supporting electrolytic salts listed above, the use of lithium bis(trifluoromethanesulfonyl)imide (LiN(SO$_2$CF$_3$)$_2$) leads to enhanced ionic conductivity and flexibility of the polyether-based organic solid electrolyte.

The polyether-based organic solid electrolyte may contain a metal oxide nanofiller. To be more specific, the polyether-based organic solid electrolyte may contain SiO$_2$, TiO$_2$, ZrO$_2$, or similar. This leads to a further improvement of ionic conductivity.

Method for Producing the Battery Electrode Material 1000

The battery electrode material 1000 can be produced by, for example, the following method.

Figure 4:
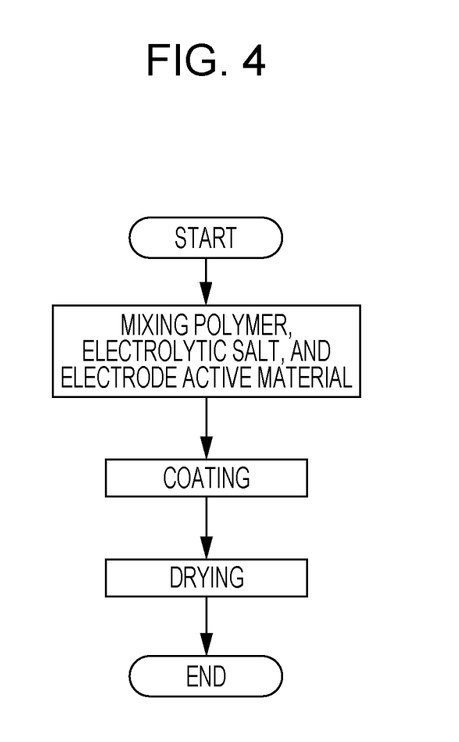
FIG. 4 illustrates an example of a method for producing the battery electrode material.

FIG. 4 illustrates an example of a method for producing the battery electrode material 1000.

First, a polymer having an ether bond, an electrolytic salt, and an electrode active material are mixed.

Here is a more specific example. First, a polymer having an ether bond, an electrolytic salt, and a diluent are mixed. This produces a solution containing a polyether-based organic solid electrolyte. The diluent can be, for example, acetonitrile, An electrode active material is then mixed with the solution containing a polyether-based organic solid electrolyte. This yields a liquid mixture.

Then the liquid mixture is, for example, heated and stirred for coating.

The solvent in the liquid mixture is then removed through drying. This produces particles of an electrode active material coated with the polyether-based organic solid electrolyte.

The battery electrode material 1000 according to Embodiment 1 may be used as a cathode material in a battery. In such a battery, the electrode active material particle 100 serves as a particle of a cathode active material.

The battery electrode material 1000 according to Embodiment 1 may be used as an anode material in a battery. In such a battery, the electrode active material particle 100 serves as a particle of an anode active material.

Embodiment 2

The following describes Embodiment 2. What has already been described in Embodiment 1 is not repeated, where appropriate.

The battery according to Embodiment 2 is a battery in which the battery electrode material 1000 described in Embodiment 1 is used as a structural element.

The battery according to Embodiment 2 has a cathode, an anode, and a solid electrolyte (=first solid electrolyte).

The cathode contains one or more particles of a cathode active material.

The anode contains one or more particles of an anode active material.

The solid electrolyte is disposed between the cathode and the anode.

The solid electrolyte is, for example, a sulfide solid electrolyte or an oxide solid electrolyte. The solid electrolyte is, for example, an inorganic solid electrolyte.

At least one of the surface of the particle of the cathode active material and the surface of the particle of the anode active material is coated with a polyether-based organic solid electrolyte.

The polyether-based organic solid electrolyte is in contact with the first solid electrolyte, the solid electrolyte disposed between the cathode and the anode.

The polyether-based organic solid electrolyte is a compound of a polymer having an ether bond and an electrolytic salt.

In this structure, the polyether-based organic solid electrolyte is positioned in gaps such as those that can be formed between an electrode active material and the first solid electrolyte or between particles of the electrode active material. The formation of such gaps is reduced, and the area of electrical contact between the electrode active material and the first solid electrolyte is increased. As a result, the charge-discharge characteristics of the battery are improved.

Furthermore, the polyether-based organic solid electrolyte is more flexible and deformable than the first solid electrolyte, the solid electrolyte disposed between the cathode and the anode. To be more specific, sulfide solid electrolytes have Young's moduli of approximately 18 to 25 GPa, whereas the polyether-based organic solid electrolyte can be designed to have approximately 1 to 3 GPa. This ensures that those strains that occur when an electrode active material expands and shrinks during charging and discharging are relaxed, and the break in the first solid electrolyte that would be caused by such strains is prevented. The detachment of the first solid electrolyte from the electrode active material due to such strains is also prevented. The electrode active material and the layer of polyether-based organic solid electrolyte therefore remain in contact with each other even after repeated charge and discharge cycles. As a result, the battery can be repeatedly charged and discharged with limited loss of its charge and discharge capacities.

In the battery according to Embodiment 2, the average thickness of the coating of the polyether-based organic solid electrolyte can be 20 nm or less.

This prevents the inhibition of charge and discharge reactions by the polyether-based organic solid electrolyte.

In the battery according to Embodiment 2, the average thickness of the coating of the polyether-based organic solid electrolyte can be 10 nm or less.

This enhances the discharge capacity of the battery.

In the battery according to Embodiment 2, the polymer as a component of the polyether-based organic solid electrolyte may have an ethylene oxide structure.

This leads to increased ionic conductivity. The increased ionic conductivity allows faster transport of ions to the electrode active material through the coating polyether-based organic solid electrolyte. As a result, the charge and discharge capacities of the battery are enhanced.

In the battery according to Embodiment 2, the polymer as a component of the polyether-based organic solid electrolyte can be polyethylene oxide.

This leads to a further increase in ionic conductivity.

In the battery according to Embodiment 2, the electrolytic salt as a component of the polyether-based organic solid electrolyte can be lithium bis(trifluoromethanesulfonyl)imide.

This leads to a further increase in ionic conductivity and makes the polyether-based organic solid electrolyte even more flexible.

In the battery according to Embodiment 2, the cathode active material can be $Li(NiCoAl)O_2$.

In the battery according to Embodiment 2, the anode active material can be graphite.

In the battery according to Embodiment 2, the first solid electrolyte can be $Li_2S$—$P_2S_5$.

In the following, the details of the battery according to Embodiment 2 are described.

Figure 5A:
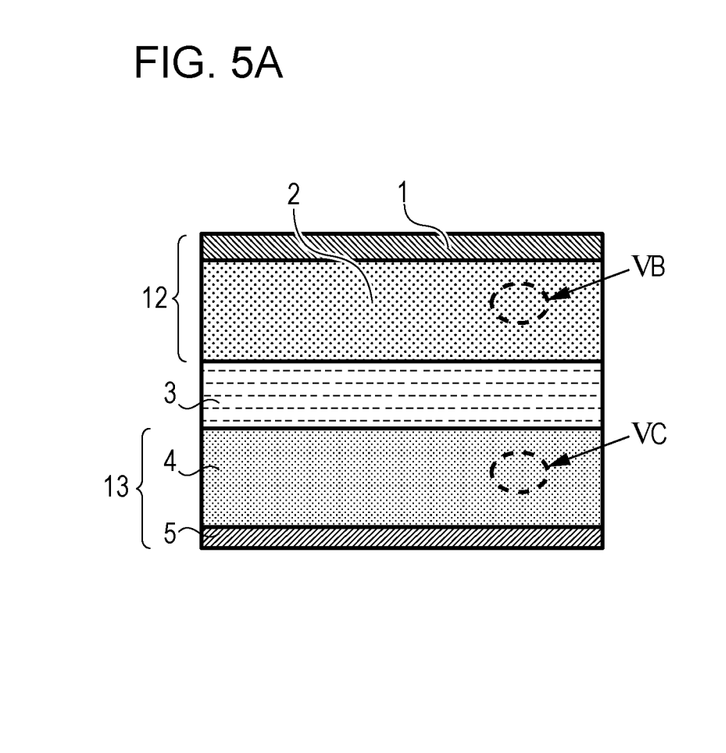
FIGS. 5A to 5C schematically illustrate the structure of an example of a battery according to Embodiment 2.
Figure 5B:
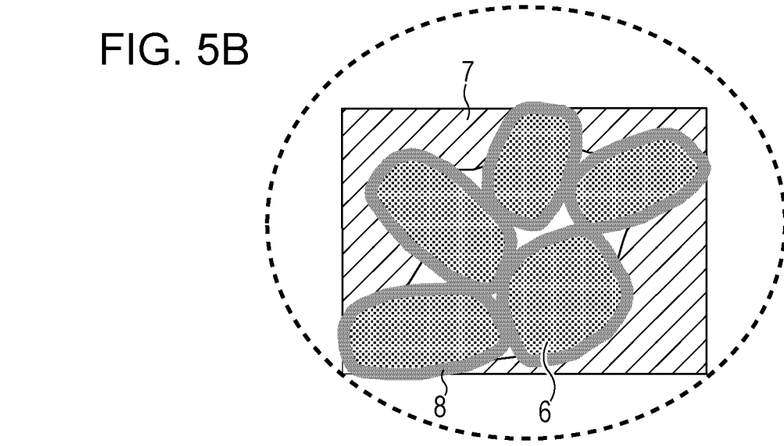
Figure 5C:
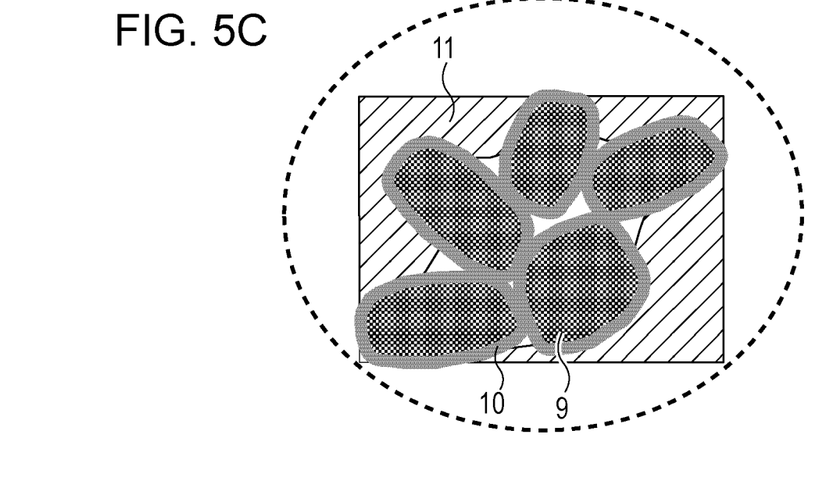

FIGS. 5A to 5C schematically illustrate the structure of an example of a battery according to Embodiment 2.

The following description takes an all-solid-state lithium secondary battery as an example of the battery illustrated in FIGS. 5A to 5C.

The all-solid-state lithium secondary battery illustrated in FIGS. 5A to 5C is composed of a cathode 12, an anode 13, and a sulfide solid electrolyte layer 3 therebetween.

The cathode 12 consists of a cathode collector 1 and a cathode mixture layer 2.

The cathode mixture layer 2 contains a cathode active material 6, a polyether-based organic solid electrolyte 8 coating the cathode active material, and a sulfide solid electrolyte 7. The cathode mixture layer 2 may contain a conductive agent to lower the resistance of the electrode. The cathode mixture layer 2 may contain a binder to improve the adhesion between particles of the cathode active material or between the cathode mixture layer and the collector.

The anode 13 consists of an anode collector 5 and an anode mixture layer 4.

The anode mixture layer 4 contains an anode active material 9, a polyether-based organic solid electrolyte 10 coating the anode active material, and a sulfide solid electrolyte 11. The anode mixture layer 4 may contain a conductive agent to lower the resistance of the electrode. The anode mixture layer 4 may contain a binder to improve the adhesion between particles of the anode active material or between the anode mixture layer and the collector.

The sulfide solid electrolyte layer 3 contains at least a sulfide solid electrolyte. The sulfide solid electrolyte layer 3 may contain a binder to improve the adhesion between particles of the sulfide solid electrolyte, between the sulfide solid electrolyte layer and the cathode mixture layer, or between the sulfide solid electrolyte layer and the anode mixture layer.

The cathode active material 6 can be a material that stores and releases metallic ions (e.g., lithium ions). Examples of the cathode active material 6 include lithium-containing transition metal oxides, transition metal fluorides, polyanionic and fluorinated polyanionic materials, and transition metal sulfides. The use of a lithium-containing transition metal oxide as the cathode active material 6 leads to production cost saving and an increase in average discharge voltage.

The cathode collector 1 can be a porous or nonporous sheet or film made of a metallic material such as aluminum, stainless steel, titanium, or an alloy of these. Aluminum and aluminum alloys are inexpensive and easy to shape into a thin film. The sheet or film can be metallic foil, mesh, or similar.

The anode active material 9 can be a material that stores and releases metallic ions (e.g., lithium ions). Examples of the anode active material 9 include metallic lithium, metals or alloys that can be alloyed with lithium, carbon, transition metal oxides, and transition metal sulfides, Examples of the forms of carbon that can be used include non-graphitic carbon (e.g., hard carbon and coke) and graphite. Examples of transition metal oxides that can be used include CuO and NiO. Examples of transition metal sulfides that can be used include the copper sulfide represented by CuS. Examples of metals or alloys that can be alloyed with lithium and can be used include silicon compounds, tin compounds, and alloys of aluminum compounds and lithium. The use of graphite as the anode active material 9 leads to production cost saving and a decrease in average discharge voltage.

The anode collector 5 can be a porous or nonporous sheet or film made of a metallic material such as stainless steel, nickel, copper, or an alloy of these. Copper and copper alloys are inexpensive and easy to shape into a thin film. The sheet or film can be metallic foil, mesh, or similar.

The cathode mixture layer 2 and/or the anode mixture layer 4 may optionally contain a conductive agent.

The conductive agent is used to lower the resistance of the electrode. Examples of conductive agents include graphite such as natural or artificial graphite, carbon black such as acetylene black and Ketjen Black, conductive fibers such as carbon or metallic fiber, graphite fluoride, aluminum and other metallic powders, conductive whiskers such as zinc oxide or potassium titanate whiskers, titanium oxide and other conductive metal oxides, and conductive polymers such as polyaniline, polypyrrole, and polythiophene. The use of a carbon conductive agent leads to cost saving.

The cathode mixture layer 2 and/or the anode mixture layer 4 may optionally contain a binder.

The binder is used to improve the adhesion between the materials constituting the electrode. Examples of binders include polyvinylidene fluoride, polytetrafluoroethylene, polyethylene, polypropylene, aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinyl pyrrolidone, polyether, polyethersulfone, hexafluoro-polypropylene, styrene-butadiene rubber, and carboxymethyl cellulose. The binder can also be a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. Mixtures of two or more selected from these can also be used as a binder.

The sulfide solid electrolyte in the sulfide solid electrolyte layer 3, the sulfide solid electrolyte 7, and the sulfide solid electrolyte 11 may be the same material.

Alternatively, the sulfide solid electrolyte in the sulfide solid electrolyte layer 3, the sulfide solid electrolyte 7, and the sulfide solid electrolyte 11 may be different materials.

Each of these sulfide solid electrolytes can be, for example, $Li_2S-P_2S_5$, $Li_2-SiS_2$, $Li_2S-B_2S_3$, $Li_2S-GeS_2$, $Li_{3.25}Ge_{0.25}P_{0.75}S_4$, or $Li_{10}GeP_2S_{12}$, optionally mixed with LiX (X is F, Cl, Br, or I), $MO_y$, $Li_xMO_y$, (M is any of P, Si, Ge, B, Al, Ga, and In; x and y are natural numbers) or similar. The use of $Li_2S-P_2S_5$ as a solid electrolyte leads to increased ionic conductivity and prevents chemical reduction at low potentials.

In Embodiment 2, the polyether-based organic solid electrolyte 8 and the polyether-based organic solid electrolyte 10 may be the same material.

Alternatively, in Embodiment 2, the polyether-based organic solid electrolyte 8 and the polyether-based organic solid electrolyte 10 may be different materials.

In Embodiment 2, it is possible that both of the cathode active material and the anode active material are coated with a polyether-based organic solid electrolyte as illustrated in FIGS. 5B and 5C.

Alternatively, in Embodiment 2, it is possible that only one of the cathode active material and the anode active material is coated with a polyether-based organic solid electrolyte.

In the battery according to Embodiment 2, the first solid electrolyte, i.e., the solid electrolyte disposed between the cathode and the anode, may be an oxide solid electrolyte.

Examples of oxide solid electrolytes that can be used include the following: NASICON solid electrolytes, typically $LiTi_2(PO_4)_3$ and its elemental substitution derivatives; (LaLi)$TiO_3$-based perovskite solid electrolytes; LISICON solid electrolytes, typically $Li_{14}ZnGe_4O_{16}$, $Li_4SiO_4$, $LiGeO_4$, and their elemental substitution derivatives; garnet solid electrolytes, typically $Li_7La_3Zr_2O_{12}$ and its elemental substitution derivatives; $Li_3N$ and its H-substituted derivatives; and $Li_3PO_4$ and its N-substituted derivatives.

Oxide solid electrolytes have Young's moduli of approximately 50 to 500 GPa, whereas the polyether-based organic solid electrolyte can be designed to have approximately 1 to 3 GPa. The polyether-based organic solid electrolyte is therefore more flexible and deformable than oxide solid electrolytes. For this reason, the aforementioned advantages also hold true for batteries in which an oxide solid electrolyte is used.

Embodiment 3

The following describes Embodiment 3. What has already been described in Embodiment 1 or 2 is not repeated, where appropriate.

Figure 9:
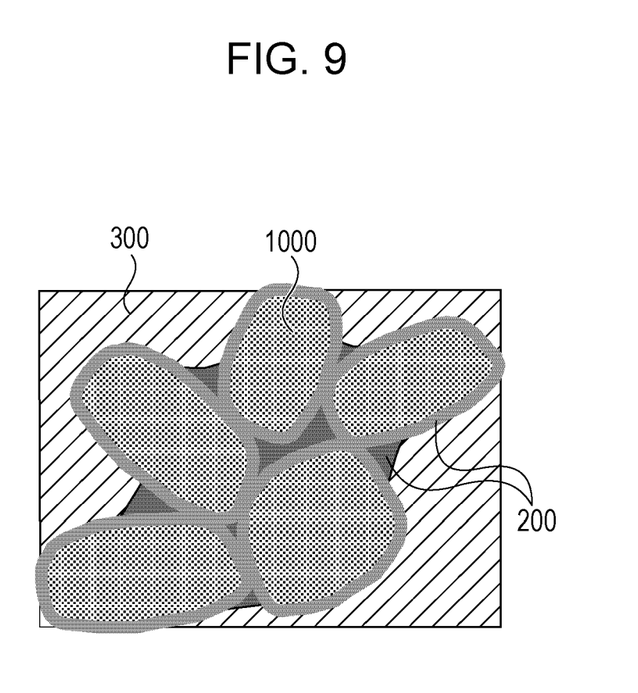
FIG. 9 schematically illustrates the structure of an aggregate of a battery electrode material according to Embodiment 3.

FIG. 9 schematically illustrates the structure of an aggregate of a battery electrode material 1000 according to Embodiment 3.

As illustrated in FIG. 9, in a battery according to Embodiment 3, the gaps between coated particles of an active material, which are particles of a cathode or anode active material coated with a polyether-based organic solid electrolyte, and a solid electrolyte 300 are filled with a polyether-based organic solid electrolyte 200.

This enhances the ionic conductivity between the coated particles of the active material and the solid electrolyte 300.

As illustrated in FIG. 9, furthermore, in a battery according to Embodiment 3, the gaps between coated particles of the active material are filled with the polyether-based organic solid electrolyte 200.

This enhances the ionic conductivity between the coated particles of the active material.

A battery according to Embodiment 3 therefore makes possible a battery with enhanced ionic conductivity. The enhanced ionic conductivity allows faster transport of ions to the electrode active material through the coating polyether-based organic solid electrolyte. As a result, the charge and discharge capacities of the battery are enhanced.

EXAMPLES

The following describes the details of an aspect of the present disclosure using examples and comparative examples.

Figure 6:
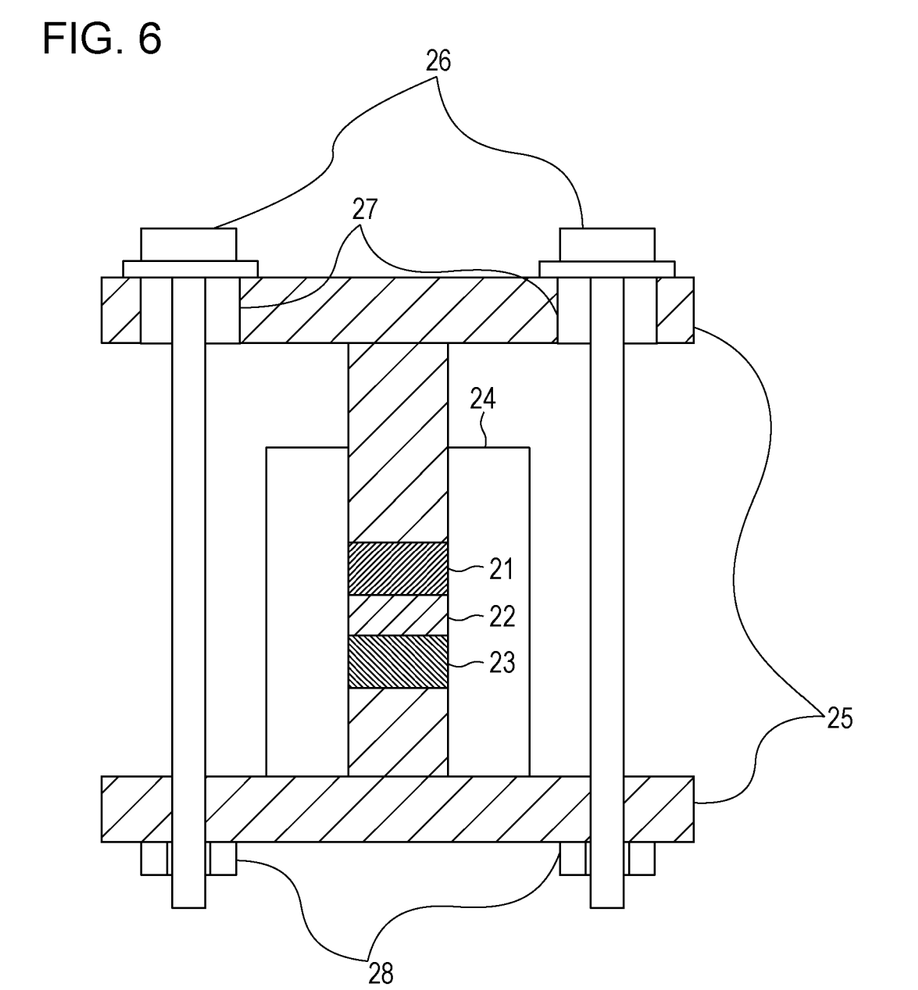
FIG. 6 is a schematic view of an electrochemical cell used in battery testing in Examples.

FIG. 6 is a schematic view of an electrochemical cell used in battery testing in Examples below.

The illustration in FIG. 6 includes a cathode 21, a solid electrolyte layer 22, an anode 23, an insulating sheath 24, conductive compression jigs 25, screws 26, insulating screw supports 27, and nuts 28.

It should be noted that sulfide solid electrolytes are deliquescent. For this reason, the sulfide solid electrolyte was handled in a glove box with an Ar atmosphere having a dew point of −60° C. or lower.

Example 1

(1) Coating of an Anode Active Material with a Polyether-Based Organic Solid Electrolyte First, 0.20 g of polyethylene oxide and 0.13 g of lithium bis(trifluoromethanesulfonyl)imide were weighed out. These materials were added to 15.62 g of acetonitrile. The resulting mixture was heated and stirred at 60° C., producing a solution containing a polyether-based organic solid electrolyte.

Then 0.15 g of graphite as an anode active material and 0.04 g of the solution containing a polyether-based organic solid electrolyte were added to 20 ml of acetonitrile as a diluent. The resulting mixture was heated and stirred at 60° C. for coating. The solvent was then removed through drying, producing an anode active material coated with a polyether-based organic solid electrolyte.

The proportion of the weight of the polyether-based organic solid electrolyte to the weight of graphite was 0.34%.

(2) Production of $Li_2S-P_2S_5$ as a Sulfide Solid Electrolyte $Li_2S$ and $P_2S_5$ were weighed out to the molar ratio of $Li_2S:P_2S_5$ of 80:20. The materials were then crushed and mixed in a mortar. The resulting mixture was milled using a planetary ball mill for 10 hours, yielding a glassy solid electrolyte.

The crystallization temperature of the glassy solid electrolyte was measured using a differential scanning calorimeter.

The glassy solid electrolyte was then subjected to 2 hours of heat treatment in an inert atmosphere at the temperature higher than the crystallization temperature by 20° C. In this way, a glass-ceramic solid electrolyte was obtained.

Using the AC impedance method, the ionic conductivity of the synthesized solid electrolyte was measured to be $7.2 \times 10^{-4}$ S/cm.

(3) Production of an Anode Mixture

The glass-ceramic $Li_2S-P_2S_5$ and the anode active material coated with a polyether-based organic solid electrolyte were weighed out to the proportions of 20:80 wt %. The materials were mixed in a mortar, producing an anode mixture.

(4) Production of an all-Solid-State Lithium Secondary Battery

In an insulating sheath, 80 mg of the glass-ceramic $Li_2S-P_2S_5$, 10 mg of the anode mixture, and a stainless steel collector were stacked in this order. The resulting stack was then pressed under a pressure of 360 MPa, producing an anode and a solid electrolyte layer.

Then on the side of the solid electrolyte layer opposite the anode side, metallic Li (a thickness of 100 μm), metallic In (a thickness of 200 m), and a stainless steel collector were stacked in this order. The resulting stack was then pressed under a pressure of 80 MPa.

Conductive compression jigs were then placed on the top and bottom of the resulting multilayer body. The jigs were fastened with screws, completing an all-solid-state lithium secondary battery.

Example 2

The quantity of the solution containing a polyether-based organic solid electrolyte for coating was changed to 0.12 g. Except for this, totally the same process as in Example 1 was repeated to produce an all-solid-state lithium secondary battery.

The proportion of the weight of the polyether-based organic solid electrolyte to the weight of graphite was 1.01%.

Example 3

The quantity of the solution containing a polyether-based organic solid electrolyte for coating was changed to 0.36 g. Except for this, totally the same process as in Example 1 was repeated to produce an all-solid-state lithium secondary battery.

The proportion of the weight of the polyether-based organic solid electrolyte to the weight of graphite was 3.02%.

Comparative Example 1

The anode active material was not coated with a polyether-based organic solid electrolyte and graphite was used in the production of the anode mixture. Except for these, totally the same process as in Example 1 was repeated to produce an all-solid-state lithium secondary battery.

Example 4

(1) Coating of a Cathode Active Material with a Polyether-Based Organic Solid Electrolyte First, 0.20 g of polyethylene oxide and 0.13 g of lithium bis(trifluoromethanesulfonyl)imide were weighed out. These materials were added to 15.62 g of acetonitrile. The resulting mixture was heated and stirred at 60° C., producing a solution containing a polyether-based organic solid electrolyte.

Then 0.30 g of $Li(NiCoAl)O_2$ as a cathode active material and 0.12 g of the solution containing a polyether-based organic solid electrolyte were added to 20 ml of acetonitrile as a diluent. The resulting mixture was heated and stirred at 60° C. for coating. The solvent was then removed through drying, producing a cathode active material coated with a polyether-based organic solid electrolyte.

The proportion of the weight of the polyether-based organic solid electrolyte to the weight of $Li(NiCoAl)O_2$ was 0.50%.

(2) Production of Li$_2$S—P$_2$S$_5$ as a Sulfide Solid Electrolyte

A glass-ceramic solid electrolyte was obtained through the process described in Example 1.

(3) Production of a Cathode Mixture

The glass-ceramic Li$_2$S—P$_2$S$_5$ and the cathode active material coated with a polyether-based organic solid electrolyte were weighed out to the proportions of 10:90 wt %. The materials were mixed in a mortar, producing a cathode mixture.

(4) Production of an all-Solid-State Lithium Secondary Battery

In an insulating sheath, 80 mg of the glass-ceramic Li$_2$S-P$_2$S$_5$, 10 mg of the cathode mixture, and a stainless steel collector were stacked in this order. The resulting stack was then pressed under a pressure of 360 MPa, producing a cathode and a solid electrolyte layer.

Then on the side of the solid electrolyte layer opposite the cathode side, metallic In (a thickness of 200 μm) and a stainless steel collector were stacked in this order. The resulting stack was then pressed under a pressure of 80 MPa.

Conductive compression jigs were then placed on the top and bottom of the resulting multilayer body. The jigs were fastened with screws, completing an all-solid-state lithium secondary battery.

Example 5

The quantity of the solution containing a polyether-based organic solid electrolyte for coating was changed to 0.36 g. Except for this, totally the same process as in Example 4 was repeated to produce an all-solid-state lithium secondary battery.

The proportion of the weight of the polyether-based organic solid electrolyte to the weight of Li(NiCoAl)O$_2$ was 1.51%.

Example 6

(1) Coating of a Cathode Active Material with a Polyether-Based Organic Solid Electrolyte First, 0.20 g of polyethylene oxide and 0.06 g of lithium bis(fluorosulfonyl)imide were weighed out. These materials were added to 14.88 g of acetonitrile. The resulting mixture was heated and stirred at 60° C., producing a solution containing a polyether-based organic solid electrolyte.

Then 0.30 g of Li(NiCoAl)O$_2$ as a cathode active material and 0.11 g of the solution containing a polyether-based organic solid electrolyte were added to 10 ml of acetonitrile as a diluent. The resulting mixture was heated and stirred at 60° C. for coating. The solvent was then removed through drying, producing a cathode active material coated with a polyether-based organic solid electrolyte.

The proportion of the weight of the polyether-based organic solid electrolyte to the weight of Li(NiCoAl)O$_2$ was 0.49%.

Except for these, totally the same process as in Example 4 was repeated to produce an all-solid-state lithium secondary battery.

Comparative Example 2

The cathode active material was not coated with a polyether-based organic solid electrolyte and Li(NiCoAl)O$_2$ was used in the production of the cathode mixture. Except for these, totally the same process as in Example 4 was repeated to produce an all-solid-state lithium secondary battery.

Charge and Discharge Test 1

The all-solid-state lithium secondary batteries of Examples 1 to 3 and Comparative Example 1 were subjected to a charge and discharge test under the following conditions.

Each of the all-solid-state lithium secondary batteries was placed in a temperature-controlled bath at 80° C.

The battery was charged (graphite was allowed to store lithium) at a current level corresponding to a 0.05 C rate (20-hour rate) with respect to the theoretical capacity of the battery until a voltage of 0 V.

The battery was then discharged (graphite was allowed to release lithium) at the same current level, corresponding to a 0.05 C rate, until a voltage of 2 V.

Figure 7:
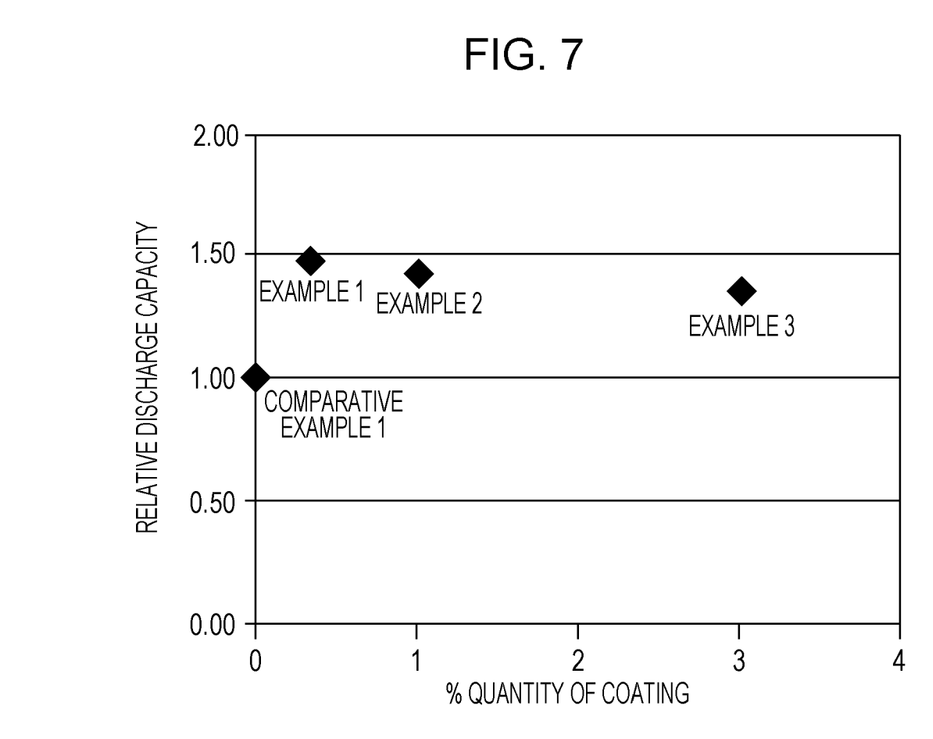
FIG. 7 is a plot of the quantity of coating polyether-based organic solid electrolyte in Examples 1 to 3 versus discharge capacity in Examples 1 to 3 as a ratio to that in Comparative Example 1.

Table 1 and FIG. 7 summarize the quantity (%) of coating polyether-based organic solid electrolyte and the average thickness (nm) of the coating in Examples 1 to 3, along with the discharge capacity in Examples 1 to 3 as a ratio to that in Comparative Example 1.

TABLE 1

| | Quantity of coating [%] | Average thickness [nm] | Relative discharge capacity |
|---|---|---|---|
| Example 1 | 0.34 | 1.9 | 1.48 |
| Example 2 | 1.01 | 5.6 | 1.43 |
| Example 3 | 3.02 | 16.7 | 1.35 |
| Comparative Example 1 | 0 | 0 | 1.00 |

As can be seen from the table, the discharge capacity was high in Examples 1 to 3 as compared with Comparative Example 1.

These results demonstrate that coating graphite as an anode active material with a polyether-based organic solid electrolyte improves the charge and discharge characteristics of the battery.

Charge and Discharge Test 2

The all-solid-state lithium secondary batteries of Examples 4 to 6 and Comparative Example 2 were subjected to a charge and discharge test under the following conditions.

Each of the all-solid-state lithium secondary batteries was placed in a temperature-controlled bath at 80° C.

The battery was charged at a current level corresponding to a 0.05 C rate (20-hour rate) with respect to the theoretical capacity of the battery until a voltage of 3.7 V.

The battery was then discharged at the same current level, corresponding to a 0.05 C rate, until a voltage of 1.9 V.

Figure 8:
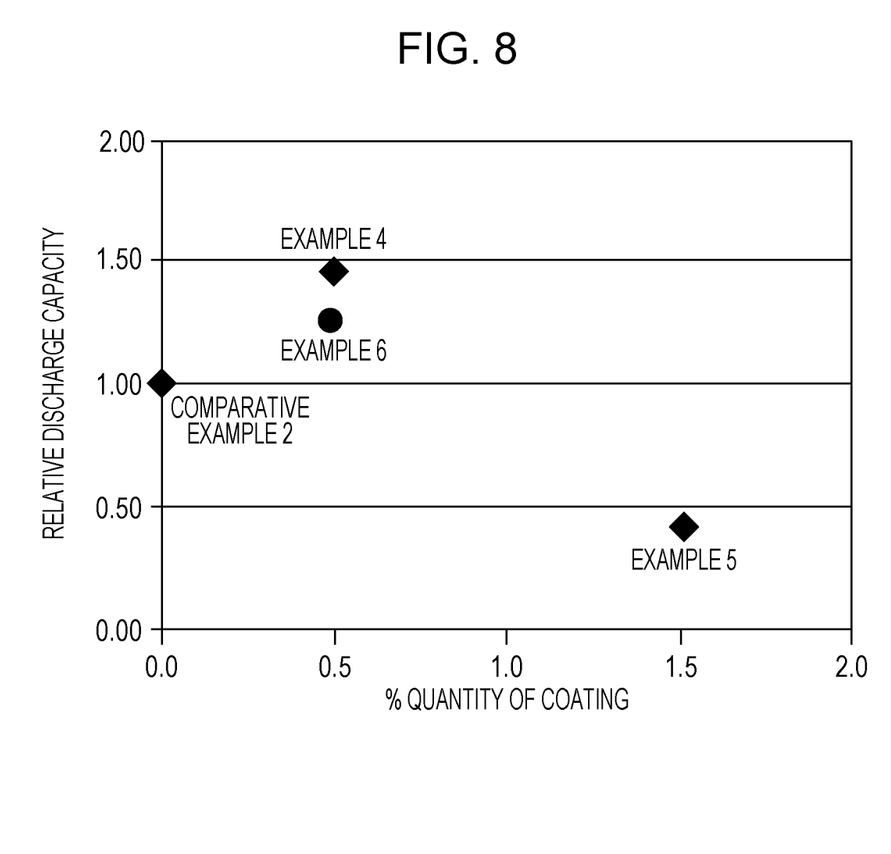
FIG. 8 is a plot of the quantity of coating polyether-based organic solid electrolyte in Examples 4 to 6 versus discharge capacity in Examples 4 to 6 as a ratio to that in Comparative Example 2.

Table 2 and FIG. 8 summarize the quantity (%) of coating polyether-based organic solid electrolyte and the average thickness (nm) of the coating in Examples 4 to 6, along with the discharge capacity in Examples 4 to 6 as a ratio to that in Comparative Example 2,

TABLE 2

| | Quantity of coating [%] | Average thickness [nm] | Relative discharge capacity |
|---|---|---|---|
| Example 4 | 0.50 | 10 | 1.46 |
| Example 5 | 1.51 | 25 | 0.41 |
| Example 6 | 0.49 | 10 | 1.26 |
| Comparative Example 2 | 0 | 0 | 1.00 |

As can be seen from the table, the discharge capacity was high in Examples 4 and 6 as compared with Comparative Example 2, These results demonstrate that coating Li(NiCoAl)O$_2$ as a cathode active material with a polyether-based organic solid electrolyte improves the charge and discharge characteristics of the battery.

In Example 5, the discharge capacity was lower than in Comparative Example 2. A possible cause is that in Example 5, the average thickness of the coating of the polyether-based organic solid electrolyte around the cathode active material was approximately 25 nm. That is, the average thickness of the coating of the polyether-based organic solid electrolyte was beyond the upper limit of the range of preferred thicknesses mentioned in Embodiment 1. It seems that the interposition of a polyether-based organic solid electrolyte having a large average thickness inhibited supplies of electrons to the active material.

Furthermore, the discharge capacity in Example 4 was greater than that in Example 6. A possible cause is that in Example 4, the polyether-based organic solid electrolyte contained LiN(SO$_2$CF$_3$)$_2$ as a lithium-containing supporting electrolytic salt. In Example 6, the lithium-containing supporting electrolytic salt in the polyether-based organic solid electrolyte was LiN(SO$_2$F)$_2$. As mentioned in Embodiment 1, the use of LiN(SO$_2$CF$_3$)$_2$ as a lithium-containing supporting electrolytic salt leads to enhanced ionic conductivity and flexibility of the polyether-based organic solid electrolyte. It appears that this difference resulted in a higher discharge capacity of the battery.

An electrode material according to an aspect of the present disclosure for batteries can be suitably used as an electrode material for batteries such as all-solid-state secondary batteries.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A battery comprising:
   a cathode;
   an anode; and
   a solid electrolyte layer including a first solid electrolyte, wherein:
   the cathode contains a particle of a cathode active material;
   the anode contains a particle of an anode active material;
   the solid electrolyte layer is disposed between the cathode and the anode;
   a surface of the particle of the cathode active material is coated with a cathode-side polyether-based organic solid electrolyte;
   a surface of the particle of the anode active material is coated with an anode-side polyether-based organic solid electrolyte;
   the cathode-side polyether-based organic solid electrolyte and the anode-side polyether-based organic solid electrolyte are in contact with the first solid electrolyte;
   the cathode-side polyether-based organic solid electrolyte and the anode-side polyether-based organic solid electrolyte are a compound of a polymer having an ether bond and an electrolytic salt;
   the first solid electrolyte is an inorganic solid electrolyte;
   the cathode-side polyether-based organic solid electrolyte and the anode-side polyether-based organic solid electrolyte are more flexible than the first solid electrolyte; and
   the coating of the cathode-side polyether-based organic solid electrolyte and the anode-side polyether-based organic solid electrolyte have an average thickness of 20 nm or less; and
   an aggregate of particles of the cathode active material is surrounded by the first solid electrolyte, and the particles of the cathode active material of the aggregate are coated with the cathode-side polyether-based organic solid electrolyte and are in contact with each other and gaps between the coated particles of the active material of the aggregate are filled with the polyether-based organic solid electrolyte; or
   an aggregate of particles of the anode active material is surrounded by the first solid electrolyte, and the particles of the anode active material of the aggregate are coated with the anode-side polyether-based organic solid electrolyte and are in contact with each other and gaps between the coated particles of the active material of the aggregate are filled with the polyether-based organic solid electrolyte.

2. The battery according to claim 1, wherein the coating of the polyether-based organic solid electrolyte and the anode-side polyether-based organic solid electrolyte have an average thickness of 10 nm or less.

3. The battery according to claim 1, wherein the polymer has an ethylene oxide structure.

4. The battery according to claim 3, wherein the polymer is polyethylene oxide.

5. The battery according to claim 1, wherein the electrolytic salt is a lithium-containing supporting electrolytic salt.

6. The battery according to claim 5, wherein the electrolytic salt is lithium bis(trifluoromethanesulfonyl)imide.

7. The battery according to claim 1, wherein the first solid electrolyte is a sulfide solid electrolyte.

8. The battery according to claim 7, wherein the first solid electrolyte is Li$_2$S-P$_2$S$_5$.

9. The battery according to claim 1, wherein the cathode active material is Li(NiCoAl)O$_2$.

10. The battery according to claim 1, wherein the anode active material is graphite.

* * * * *